United States Patent [19]

Atchley

[11] Patent Number: 4,721,063
[45] Date of Patent: Jan. 26, 1988

[54] KNOCK-DOWN ANIMAL FEEDER

[76] Inventor: Frank W. Atchley, 461 Walnut St., Napa, Calif. 94558

[21] Appl. No.: 911,460

[22] Filed: Sep. 25, 1986

[51] Int. Cl.⁴ .............................................. A01K 5/00
[52] U.S. Cl. ..................................... 119/52 R; 119/61
[58] Field of Search ..................... 119/77, 51.5, 51 R, 119/52 R, 72, 61

[56] References Cited

U.S. PATENT DOCUMENTS

| | | | |
|---|---|---|---|
| 3,202,131 | 8/1965 | Jones | 119/61 |
| 3,664,304 | 5/1972 | Carter | 119/61 |
| 3,720,184 | 3/1973 | Pearce | 119/70 |
| 3,722,476 | 3/1973 | Van Niess et al. | 119/61 |
| 3,731,658 | 5/1973 | Livermore et al. | 119/61 |
| 3,810,446 | 5/1974 | Kightlinger et al. | 119/61 |
| 4,034,715 | 7/1977 | Arner | 119/77 |
| 4,270,490 | 6/1981 | Kopp | 119/61 |
| 4,281,624 | 8/1981 | Raines | 119/77 |
| 4,357,905 | 11/1982 | Carpenter | 119/51.5 |

Primary Examiner—Paul J. Hirsch
Attorney, Agent, or Firm—Harris Zimmerman; Howard Cohen

[57] ABSTRACT

An animal feeder has a base member forming a feeding dish and an upright feed dispensing member from which new feed flows into the dish to replace that consumed by an animal. One of the members has detent projections which engage detent receiving grooves on the other member when the members are forced together. The construction enables easy and very rapid assembly without the use of tools or fastening devices such as screws, nails or the like. The feeders may be warehoused, transported and stocked in retail outlets in space and cost saving disassembled form without presenting purchasers with a difficult assembly task. The construction may include a moat around the dish portion for entrapping spillage and a configuration which inhibits displacement by activities of an animal.

15 Claims, 10 Drawing Figures

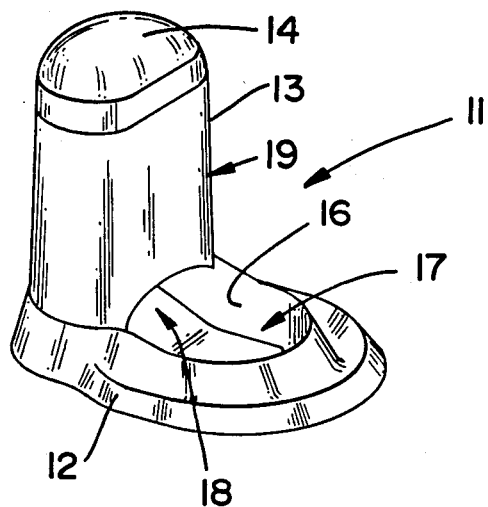
FIG_1
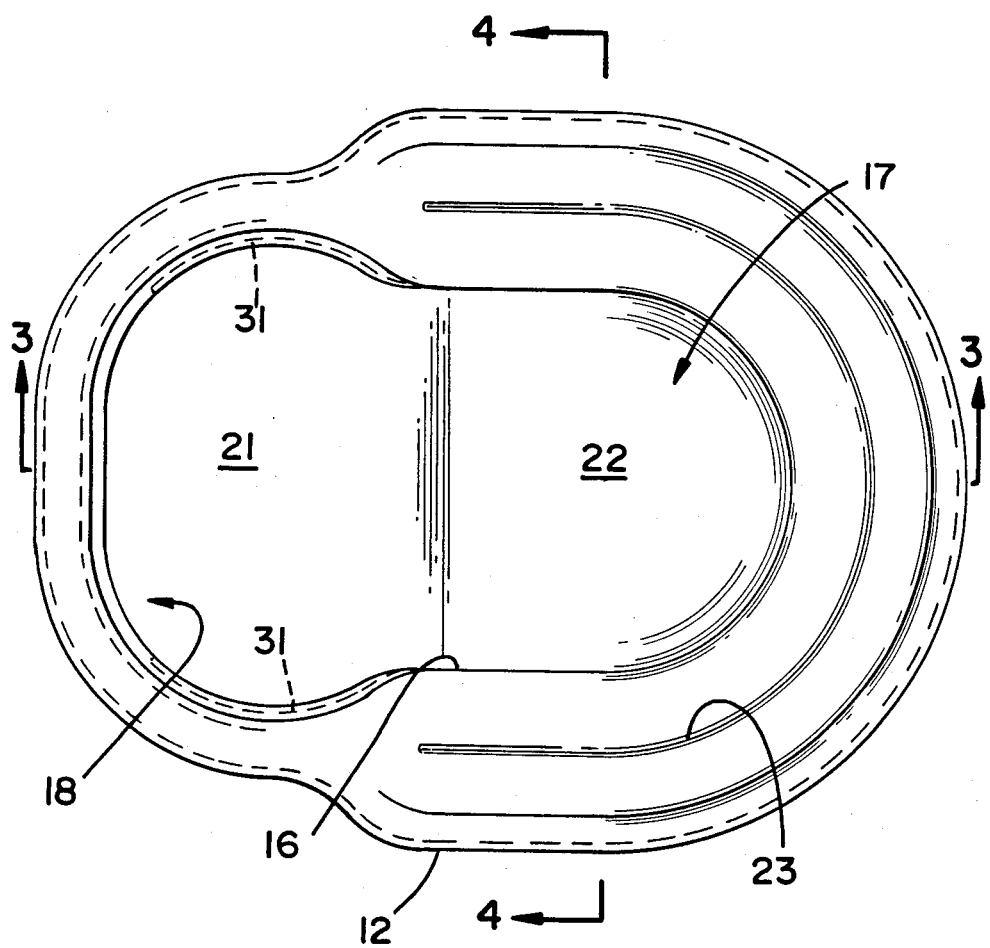
FIG_2

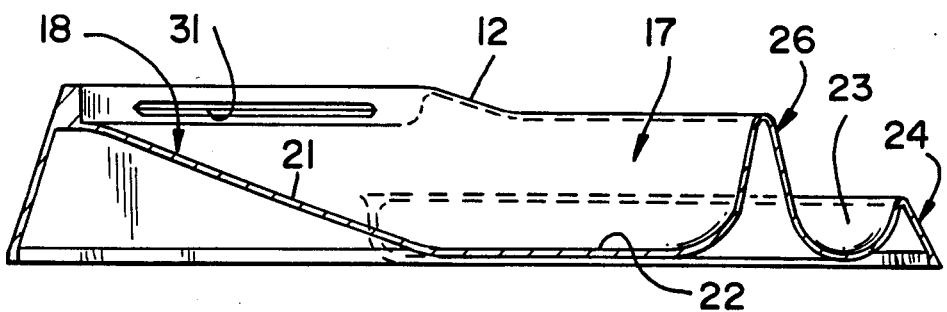
FIG _ 3
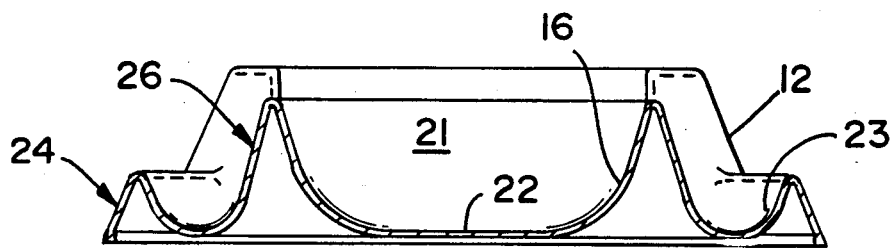
FIG _ 4
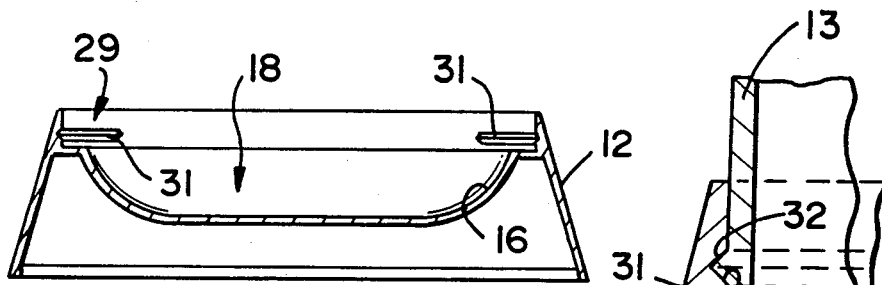
FIG _ 5
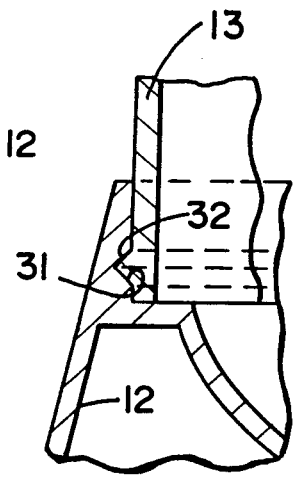
FIG _ 6
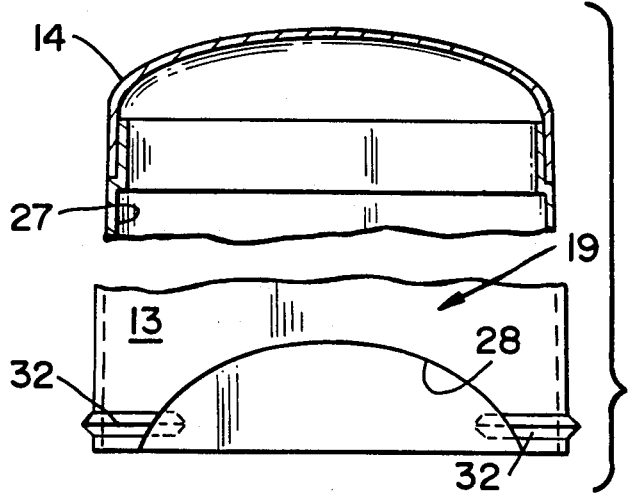
FIG _ 7

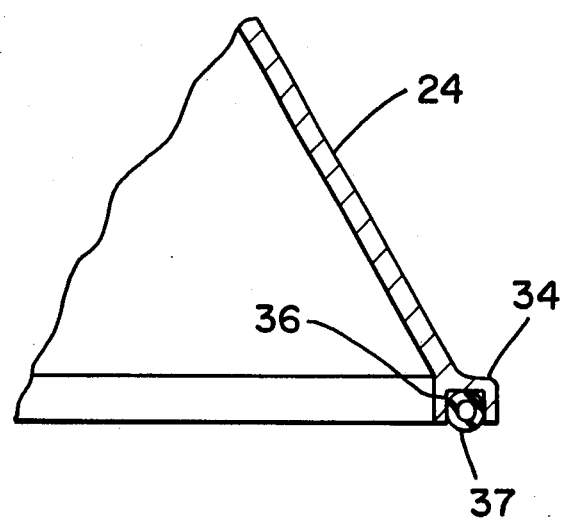
FIG _ 8
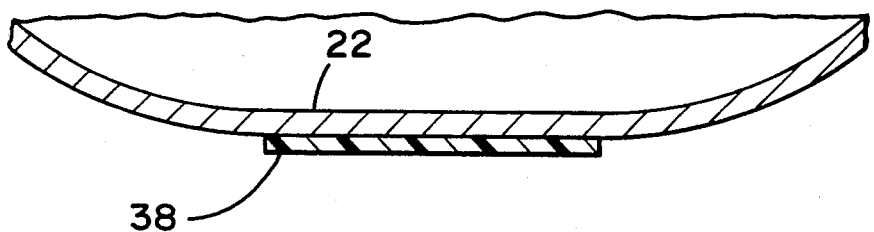
FIG _ 9
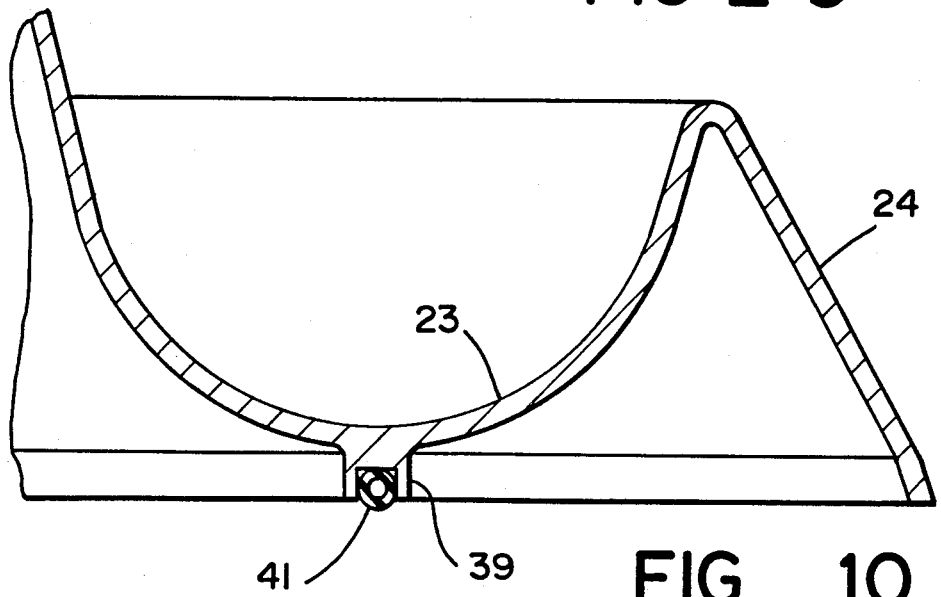
FIG _ 10

KNOCK-DOWN ANIMAL FEEDER

TECHNICAL FIELD

This invention relates to apparatus for feeding animals and more particularly to devices which release stored feed into a feeding dish to replace the feed consumed by an animal.

BACKGROUND OF THE INVENTION

Simple dishes for feeding animals need to be manually refilled at frequent intervals and this may not always be possible or at least convenient for the caretakers of the animals. Pet owners, for example, may be away for a period of days or may be engaged in activities that can unexpectedly interfere with a regular feeding schedle.

One type of animal feeder which accomodates to such circumstances includes a dish and a feed container which extends upward from one edge of the dish. An opening at the bottom of the container is positioned to cause a gravity flow of new feed into the dish at more or less the rate that it is consumed by an animal. Such animal feeders are particularly suited for dispensing so called dry feed for cats, dogs or the like as such feeds are usually granular in form and readily flow out of the container when the underlying supporting feed granules are removed from the dish by the animal.

Prior feeders of this type tend to have an undesirably complicated construction and are also inherent bulky if proportioned to provide adequate feed storage capacity. Manufactured lots of such feeders must usually be stored for a period in warehouses, transported to pet stores or other retail outlets in trucks or the like and must then again be stocked in quantity at the retail outlet. The cost of each of these operations is adversely affected by the bulk of the feeders.

Such costs can be reduced by distributing the feeders in a disassembled or partially dissasembled form but prior constructions then impose an undesirably difficult assembly procedure on the purchaser. Depending on the particular construction, such assembly may variously be taxing, time consuming, require the use of one or more tools or may be readily subject to error.

Prior feeders of this type also tend to be susceptible to displacement and to spillage of the contents by the activities of the animal. Such feeders may also attract crawling insects and the problem can be particularly acute at feeders which are designed to go unattended for more than the usual period of time.

The present invention is directed to overcoming one or more of the problems discussed above.

SUMMARY OF THE INVENTION

In one aspect, the present invention provides an animal feeder having a base member with a concavity in the upper surface. The forward portion of the concavity is shaped to define an open feeding dish and a tubular feed dispensing member extends upward from the base member at the back of the concavity, the feed dispensing member having an internal feed storage chamber which is communicated with the forward portion of the concavity. A first of the members has at least one detent receiving recess and the second of the members has at least one detent projection positioned to extend into the recess to resist separation of the members. At least one of the members is formed of resilient material in the region of the detent recess and detent projection whereby the detent projection is engagable with the recess by forcing the members together.

In another aspect, the invention provides an animal feeder which includes a base member having a concavity in the upper surface, the forward portion of the concavity defining an open feeding dish and the back portion of the concavity being of greater width than the adjacent end of the forward portion. The back portion of the concavity has a floor which slopes downwardly towards the floor of the forward portion and the base member includes a spillage receiving moat which extends around the forward portion of the concavity. A detent receiving groove extends along each sidewall of the back portion of the concavity. The animal feeder also includes a resilient tubular upright feed dispensing member having an internal feed storage chamber and having a lower end which extends into the back portion of the base member concavity. The lower end of the feed dispensing member has a configuration conforming to that of the back portion of the concavity and has a notch located to communicate the internal chamber with the forward portion of the concavity. Detent projections extend along each side of the lower end of the feed dispensing member and are entered into the detent receiving grooves of the base member.

Animal feeders embodying the invention may be stored and transported in a less space consuming disassembled form and can then be easily and very quickly assembled by the purchaser without the use of tools or fastening means such as screws, nails or the like. The feed dispensing member need only be inserted into back of the base member and seats with a snap action. In the preferred forms, the animal feeder has a configuration which resists displacement by the animal and which inhibits spillage as a moat extends around the dish portion of the feeder. When necessary, the moat can be partially filled with substances such as salt or salad oil that are not harmful to the animal but which form a barrier to crawling insects.

BRIEF DESCRIPTION OF THE DRAWINGS

FIG. 1 is a perspective view of an assembled animal feeder in accordance with the preferred embodiment of the invention.

FIG. 2 is a plan view of the base member component of the animal feeder of FIG. 1.

FIG. 3 is an elevation section view of the base member taken along line 3—3 of FIG. 2.

FIG. 4 is a cross section view of the forward portion of the base member taken along line 4—4 of FIG. 2.

FIG. 5 is s foreshortened elevation view, partially in section, of the feed dispensing component and lid of the animal feeder of the preceding figures.

FIG. 6 is a cross section view of the back portion of the base member taken along line 6—6 of FIG. 2.

FIG. 7 is a fragmentary section view illustrating the manner of engagement of the base member and feed dispensing member.

FIG. 8 is an enlarged cross-sectional view of a non-skid, floor engaging embodiment of the present invention.

FIG. 9 is a cross-sectional view of a further non-skid, floor engaging embodiment of the present invention.

FIG. 10 is an enlarged cross-sectional view of another non-skid, floor engaging embodiment of the present invention.

DESCRIPTION OF THE PREFERRED EMBODIMENTS

Referring initially to FIG. 1 of the drawings, the animal feeder 11 of this particuular example of the invention has only three components which are a base member 12, a tubular feed dispensing member 13 which extends upward at the back of the base member and a lid 14 which closes the top of the feed dispensing member. The base member 12 has a concavity 16 in the upper surface which is shaped to define an open feeding dish at the forward portion 17 of the concavity. The components 12, 13 and 14 may be economically formed of light weight plastics, of which suitable examples will be hereinafter described, although other materials may also be used if desired.

Referring to FIGS. 2 and 3 in conjunction, the back portion 18 of the base member concavity 16 is wider than the adjacent end of the forward portion 17 to prevent the feed dispensing member 13 of FIG. 1 from moving forwardly relative to the base member 12. The wall 19 of the feed dispensing member 13 is rounded at the sides while being relatively flat at the front and back. The back portion 18 of the base member concavity 16 has a conforming configuration. This non-circular configuration prevents entry of the lower end of the feed dispensing member 13 into the base member 12 except when the two members are correctly oriented for engagement of detents which will be hereinafter described.

Referring to FIGS. 3 and 4 in conjunction, the floor 21 of the concavity back portion 18 is more elevated than the floor 22 of the forward portion 17 and slopes downwardly to floor 22. This provides a ramp which facilitates the flow of new feed into the forward portion 17 to replace that consumed by an animal.

Base member 12 is preferably provided with a spillage receiving trough or moat 23 which extends around the forward portion 17 of concavity 16, such moat being of the general type described and claimed in my copending U.S. application Ser. No. 06/814,889. filed Dec. 30, 1985, and entitled Spill Resistant Animal Dish. As also described in that copending application, it is advantageous if the sidewall 24 of the base member 12 slopes downwardly and outwardly from the rim of moat 23 and if the inner wall 26 of the moat slopes downwardly and outwardly from the rim of the dish which in the present feeder 11 is defined by the forward portion 17 of concavity 16. This tends to inhibit displacement of the feeder 11 by activities of the animal as it causes horizontal forces exerted against the side of the base member to create a downward force component, by wedging action, which increases frictional adherence of the feeder to the underlying surface. Resistance to spillage and displacement is particularly desirable in a feeder 11 of the present kind that is designed to go unattended for relatively long periods of time.

Referring now to FIG. 6, the upright tubular feed dispensing member 13 has an internal feed storage chamber 27 which is closed at the top by the removable lid 14, the lid being frictionally engaged on the upper end of member 13 in this example. Lid 14 is preferably free of handles or other protuberances that could be easily gripped by the jaws or paws of an animal. An arcuate notch 28 at the base of the front of member 13 provides a larger feed flow passage into the forward portion 17 of concavity 16 than would otherwise be present. The front part of the wall 19 of the feed dispensing member 13 preferably slopes forward and downward to further facilitate release of feed from chamber 27.

With reference to FIGS. 5 and 6 in conjunction, the base member 12 and feed dispensing member 13 are secured together by detent means 29 which enable a quick and easy assembly of the members without the use of tools or additional fastening devices. In particular, one of a pair of detent receiving recesses 31 is provided in base member 12 at each opposite side of the back portion 18 of concavity 16, the recesses being arcuate grooves of V-shaped cross section having curvatures conforming to those of the corresponding sidewalls of concavity portion 18. A detent projection 32 of similar configuration is provided at each side of the lower end of feed dispensing member 13. One or both of the base member 12 and feed dispensing member 13 is formed of somewhat resilient material, at least in the region of the recesses 31 and projections 32, to enable forcing of the lower end of the feed dispensing member into concavity back portion 18 until the detent projections seat in the grooves 31 as depicted in FIG. 7. Sufficient resiliency is provided in the present example by forming the base member 12 of polypropylene plastic and by forming the feed dispensing member 13 of clear styrene plastic although other materials may also be used for the purpose. Such use of a transparent material to form the feed dispensing member is advantageous as the amount of feed in the feeder can then be determined simply by visual injection.

The V-shaped cross section of the detent projections 32 and detent receiving recesses 31 is advantageous in that it enables disassembly of the members 12 and 13 if necessary to facilitate cleaning and storage when not in use.

A further feature of the present invention is the provision of a non-skid floor engaging support. It is a common experience among pet owners that the feeding habits of dogs, cats, and the like involve nuzzling their food and dish, and that this action is capable of propelling the dish along the floor. With regard to FIG. 7, the present invention may be provided with a channel 34 integrally formed in the lower edge portion of the sidewall 24 and having a continuous channel cavity 36 opening downwardly therefrom. A length of resilient tubing formed of high friction rubber or the like is secured in the channel cavity 36 in compressive engagement, with the lower surface of the tubing disposed to support the assembly on a floor or ground surface. The tubing provides sufficient frictional action to prevent sliding translation of the assembly due to feeding of animals from the dish.

A further embodiment of the non-skid feature of the present invention, shown in FIG. 10, also provides a channel 39, in this embodiment integrally formed with the moat 23 and extending downwardly from the lower surface thereof. A length of resilient tubing 41 is retained in the channel 39 by elastic compression, with the lower surface of the tubing disposed slightly below the lower edge of the sidewall 24. The channel 39 may extend the full length of the moat 23, or may be provided in several segments spaced about the periphery of the moat, to provide sufficient frictional engagement with the supporting floor surface to prevent lateral sliding translation threralong.

Another embodiment of the invention, shown in FIG. 9, includes a pad 38 secured to the lower surface of the panel 22. The pad may comprise a segment of resilient foam plastic or rubber which has an intrinsically high surface friction, and which is self-adhesive on the upper surface. The thickness of the pad 38 is chosen so that the pad bears a substantial portion of the weight of the feeder, and the lower edge of the sidewall 24 bears a minor portion of the weight.

Feeders 11 of the above described forms may be warehoused, packaged, shipped and stocked in retail outlets in a relatively less space consuming disassembled form without inconvenience to the ultimate purchaser in view of the ease of assembly. The assembled unit then securely resists separation by the normal activities of an animal and, in the above described preferred configuration, also resists displacement and inhibits spillage from such activities.

While the invention has been described with respect to a particular embodiment, many modifications are possible and it is not intended to limit the invention except as defined in the following claims.

I claim:

1. A knock-down animal feeder, including;
   a base member having a concavity in the upper surface thereof, the forward portion of said concavity being shaped to define an open feeding dish;
   a tubular feed dispensing member, comprising a continuous curved sidewall defining a tubular member having opposed, open, first and second ends;
   means for assembling said first end of said feed dispensing member to said base member in generally permanent fashion, including at least one detent receiving recess and at least one detent projection formed in complementary fashion in said members and disposed for mutual engagement to resist separation of said members, at least one of said members being formed of resilient material in the region of said detent recess and detent projection whereby said detent projection is engagable with said recess by forcing said members together;
   means for releasably closing said second end of said feed dispensing member to permit filling of said feed dispensing member without separating said feed dispensing member and said base member, including a lid removable secured to said second end of said closed curved sidewall;
   said first end of said closed curved sidewall being in open flow communication with the back portion of said concavity to deliver feed gravitally from said feed dispensing member to said open feeding dish.

2. The knock-down animal feeder of claim 15, wherein said open feeding dish includes a bottom panel, a side panel extending continuously from the edges of said bottom panel and upwardly therefrom to a continuous first rim, a moat panel having a generally U-shaped conformation and one edge extending continuously from said rim about said feeding dish and downwardly therefrom, the lower extent of said moat panel being disposed in generally coplanar relationship with said bottom panel.

3. The knock-down animal feeder of claim 2, wherein said moat panel includes an outer peripheral edge defining a second continuous rim about said feeding dish, and an outer peripheral panel extending from said second continuous rim and downwardly therefrom to a ground engaging lower edge thereof, said ground engaging lower edge being disposed in approximate coplanar relationship with said bottom panel.

4. The animal feeder of claim 1 wherein the lower end of said feed dispensing member extends into the back portion of said concavity of said base member, further including means for preventing entry of said lower end of said feed dispensing member into said back portion of said concavity except when said detent projection is positioned for engagement with said detent receiving recess.

5. The animal feeder of claim 4 wherein the forward portion of said lower end of said feed dispensing member has a notch communicating said chamber with said forward portion of said concavity.

6. The animal feeder of claim 1 wherein a back portion of said concavity situated below said feed dispensing member has a floor which slopes downwardly towards the floor of said forward portion of said concavity.

7. The animal feeder of claim 1 wherein said base member has a spillage receiving moat extending around at least the forward portion of said concavity.

8. The animal feeder of claim 7 wherein said moat has an inner wall adjacent said forward portion of said concavity that slopes downwardly and outwardly from the rim of said concavity and wherein the sidewall of said base member slopes downwardly and outwardly from the rim of said moat.

9. The animal feeder of claim 1 wherein said back of said concavity and at least the lower end of said feed dispensing member are of greater width than the adjacent more forward portion of said concavity.

10. The animal feeder of claim 1 wherein said at least one of said members has a pair of said detent receiving recesses each being located at an opposite side of said back of said concavity and wherein the other member has a pair of said detent projections each also being located at an opposite side of said back of said concavity.

11. The animal feeder of claim 10 wherein said detent receiving recesses are arcuate grooves in said base member and have V-shaped cross sectional configurations and wherein said detent projections are arcuate bosses on said feed dispensing member and have cross sectional configurations conforming to that of said grooves.

12. The animal feeder of claim 1, further including anti-skid means extending from said base member to support said combination and to resist lateral slising translation along the ground.

13. The animal feeder of claim 12, wherein said anti-skid means includes a ground engaging foam pad secured to the bottom surface of said concavity.

14. The animal feeder of claim 7, further including anti-skid means for supporting said base member in ground-engaging fashion and resisting lateral sliding translation along the ground, said anti-skid means including a channel opening downwardly from the bottom surface of said moat, and a resilient tubing member retained in said channel and extending therefrom to support said base member on the ground.

15. The animal feeder of claim 8, further including anti-skid means for supporting said base member in ground engaging fashion and resisting lateral sliding translation along the ground, said anti-skid meand including a channel extending along and opening downwardly from the lower edge of said sidewall, and a resilient tubing member retained in said channel and extending therefrom to support said base member on the ground.

* * * * *